(12) United States Patent
Suh et al.

(10) Patent No.: US 12,095,417 B2
(45) Date of Patent: Sep. 17, 2024

(54) PREDICTION SYSTEM FOR SOLAR PHOTOVOLTAIC GENERATION

(71) Applicant: Kyungpook National University Industry—Academic Cooperation Foundation, Daegu (KR)

(72) Inventors: Dongjun Suh, Gimcheon-si (KR); Bowoo Kim, Tongyeong-si (KR); Junhwa Hwang, Yeosu-si (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 437 days.

(21) Appl. No.: 17/534,369

(22) Filed: Nov. 23, 2021

(65) Prior Publication Data
US 2023/0070614 A1 Mar. 9, 2023

(30) Foreign Application Priority Data
Sep. 3, 2021 (KR) ........................ 10-2021-0117447

(51) Int. Cl.
*H02S 50/00* (2014.01)
*G01W 1/10* (2006.01)
(Continued)

(52) U.S. Cl.
CPC .............. *H02S 50/00* (2013.01); *G01W 1/10* (2013.01); *G06N 3/04* (2013.01); *G06T 7/20* (2013.01);
(Continued)

(58) Field of Classification Search
CPC ......... G06V 20/13; H02S 50/00; G01W 1/10; G06T 2207/10032; G06T 2207/30192
See application file for complete search history.

(56) References Cited

FOREIGN PATENT DOCUMENTS

| KR | 10-1980741 B1 | 5/2019 |
| KR | 102272369 B1 * | 9/2019 |

(Continued)

OTHER PUBLICATIONS

Tian, Jie, and Dongmei Chen. "A semi-empirical model for predicting hourly ground-level fine particulate matter (PM2. 5) concentration in southern Ontario from satellite remote sensing and ground-based meteorological measurements." Remote Sensing of Environment 114.2 (2010): 221-229. (Year: 2010).*

(Continued)

*Primary Examiner* — Vincent Rudolph
*Assistant Examiner* — Raphael Schwartz
(74) *Attorney, Agent, or Firm* — Park, Kim & Suh, LLC

(57) ABSTRACT

A prediction system for solar photovoltaic generation includes a region setter that sets a target region where a solar panel is installed and an adjacent region adjacent to the target region, a first data collector that collects numerical weather data of the target region and adjacent region and an amount of the solar photovoltaic generation obtained from the solar panel, a second data collector that collects weather image data of the target region and adjacent region by using a satellite image, a controller that determines whether the target region is affected by wind by comparing the weather image data to each other, and a deep learner that predicts the weather image data of the target region, and predicts the amount of the solar photovoltaic generation by using the amount of the solar photovoltaic generation, the numerical weather data and weather image data of the target region.

16 Claims, 11 Drawing Sheets

(51) Int. Cl.
*G06N 3/04* (2023.01)
*G06T 7/20* (2017.01)
*G06V 10/22* (2022.01)
*G06V 10/56* (2022.01)
*G06V 10/82* (2022.01)
*G06V 20/13* (2022.01)

(52) U.S. Cl.
CPC ............ *G06V 10/225* (2022.01); *G06V 10/56* (2022.01); *G06V 10/82* (2022.01); *G06V 20/13* (2022.01); *G06T 2207/10032* (2013.01); *G06T 2207/30192* (2013.01)

(56) References Cited

FOREIGN PATENT DOCUMENTS

| KR | 20210062389 | A | * | 11/2019 |
| KR | 10-2020-0040448 | A | | 4/2020 |
| KR | 10-2136106 | B1 | | 7/2020 |
| KR | 10-2153722 | B1 | | 9/2020 |
| KR | 10-2021-0043388 | A | | 4/2021 |
| KR | 10-2021-0062389 | A | | 5/2021 |
| KR | 10-2022-0078963 | A | | 6/2022 |
| WO | 2017/221343 | A1 | | 12/2017 |

OTHER PUBLICATIONS

Ma, Zongwei, et al. "Estimating ground-level PM2. 5 in China using satellite remote sensing." Environmental science & technology 48.13 (2014): 7436-7444. (Year: 2014).*
Marquez, Ricardo, and Carlos FM Coimbra. "Forecasting of global and direct solar irradiance using stochastic learning methods, ground experiments and the NWS database." Solar Energy 85.5 (2011): 746-756. (Year: 2011).*
Bowoo Kim, et al., "A Hybrid Spatio-Temporal Prediction Model for Solar Photovoltaic Generation Using Numerical Weather Data and Satellite Images", Remote Sens. 2020, 12, 3706; doi: 10.3390/rs12223706, 21pages.
Bowoo Kim, et al., "A Novel Hybrid Spatio-Temporal Forecasting of Multisite Solar Photovoltaic Generation", Remote Sens. 2021, 13, 2605. https://doi.org/10.3390/rs13132605, 20pages.
Han Seung Jang, et al., "Solar Power Prediction Based on Satellite Images and Support Vector Machine", IEEE Transactions on Sustainable Energy, vol. 7, No. 3, Jul. 2016, p. 1255-1263.

* cited by examiner

PREDICTION SYSTEM FOR SOLAR PHOTOVOLTAIC GENERATION

CROSS-REFERENCE TO RELATED APPLICATIONS

A claim for priority under 35 U.S.C. § 119 is made to Korean Patent Application No. 10-2021-0117447 filed on Sep. 3, 2021, in the Korean Intellectual Property Office, the entire contents of which are hereby incorporated by reference.

BACKGROUND

Embodiments of the inventive concept described herein relate to a prediction system for solar photovoltaic (PV) generation, which predicts an amount of the solar photovoltaic generation in consideration of an external weather environment.

In general, solar photovoltaic generation refers to technology in which solar light energy is converted into electricity by using photoelectric effect. In recent years, there has been a decrease in a unit price of a system for the solar photovoltaic generation, and large-scale solar farms are thus increasing all over the world.

However, the solar photovoltaic generation may have an amount of the power generation, significantly changed by an external weather factor such as a changed amount of irradiance, made due to cloud or particulate matter. It may thus be difficult to predict the amount of the solar photovoltaic generation obtained by the solar photovoltaic generation, which may interfere with a plan for stable supply and demand of the power.

Therefore, required is technology for predicting in advance the external weather factor such as the changed amount of the irradiance, made by the cloud or the particulate matter, and to accurately predict the amount of the solar photovoltaic generation based on this prediction.

SUMMARY

Embodiments of the inventive concept provide a prediction system for solar photovoltaic generation, which may effectively predict an amount of solar photovoltaic generation.

According to an exemplary embodiment, a prediction system for solar photovoltaic generation includes a region setter that sets a target region where a solar panel is installed and an adjacent region adjacent to the target region, a first data collector that collects numerical weather data of the target region and adjacent region at time "t" and an amount of the solar photovoltaic generation obtained from the solar panel at the time "t," a second data collector that collects weather image data of the target region and adjacent region at the time "t" by using a satellite image, a controller that determines whether the target region is affected by wind by comparing the weather image data at time t−1 and the weather image data at the time "t" to each other, and a deep learner that predicts the weather image data of the target region at time t+1 in response to whether the target region is affected by the wind, and predict the amount of the solar photovoltaic generation at the time t+1 by using the amount of the solar photovoltaic generation at the time "t" and the numerical weather data and weather image data of the target region at the time t+1, wherein "t" is a natural number of 2 or more.

In addition, the second data collector may include a first image data collector that collects first image data including a wind direction of the wind in the target region and adjacent region, a second image data collector that collects second image data including an amount of cloud in the target region and adjacent region, a third image data collector that collects third image data including an amount of particulate matter in the target region and adjacent region, and a fourth image data collector that collects fourth image data including an amount of irradiance in the target region and adjacent region.

In addition, the controller may include a wind-direction determination device that determines the wind direction of the wind in the target region and adjacent region, a measurement device that measures the amount of the cloud, the amount of the particulate matter and the amount of the irradiance, in the target region and the adjacent region, and an algorithm device that determines whether the target region is affected by the wind by using the wind directions of the wind, the amounts of the cloud and the amounts of the particulate matter, in the target region and the adjacent region at the time t−1 and the time "t."

In addition, the algorithm device may determine that the cloud in the target region is moved by the wind when the amount of the cloud in the target region at the time "t" is greater or less than the amount of the cloud in the target region at the time t−1, and may determine that the cloud in the target region is not moved by the wind when the amount of the cloud in the target region at the time "t" is the same as the amount of the cloud in the target region at the time t−1.

In addition, the algorithm device may determine that the particulate matter in the target region is moved by the wind when the amount of the particulate matter in the target region at the time "t" is greater or less than the amount of the particulate matter in the target region at the time t−1, and may determine that the particulate matter in the target region is not moved by the wind when the amount of the particulate matter in the target region at the time "t" is the same as the amount of the particulate matter in the target region at the time t−1.

In addition, the target region may have a shape of a square centered on a weather symbol positioned closest to the solar panel and having a predetermined length, and the adjacent regions have shapes of squares surrounding the target region and each having the same size as the target region.

In addition, the first image data may include at least one weather symbol indicating the wind direction in the target region and adjacent region, and the wind-direction determination device may determine the wind direction in the target region and adjacent region by using the weather symbol.

In addition, the second image data may include a pixel marked in a different color based on thickness of the cloud in the target region and adjacent region.

In addition, the measurement device may measure the amount of the cloud based on the thickness of the cloud in the target region and adjacent region by using the number of the pixels based on first to fourth cloud amount.

In addition, the third image data may include a pixel marked in a different color based on concentration of the particulate matter in the target region and adjacent region.

In addition, the measurement device may measure the amount of the particulate matter based on the concentration of the particulate matter in the target region and adjacent region by using the number of the pixels based on first to fourth particulate matter amount.

In addition, the fourth image data may include a pixel marked in a different color based on the amount of the irradiance in the target region and adjacent region.

In addition, the measurement device may measure the amount of the irradiance in the target region by using an average number of the pixels indicating the target region, and may measure the amount of the irradiance in the adjacent region by using an average number of the pixels indicating the adjacent region.

In addition, a machine learner included in the deep learner may predict the amount of the cloud and the amount of the particulate matter, in the target region at the time t+1 by using the amount of the cloud and the amount of the particulate matter, in the target region at the time "t" as an input variable of its artificial neural network when the target region is affected by the wind.

In addition, the machine learner included in the deep learner may determine the amount of the cloud and the amount of the particulate matter, in the target region at the time "t" as the amount of the cloud and the amount of the particulate matter, in the target region at the time t+1 when the target region is not affected by the wind.

In addition, the deep learner may predict the amount of the solar photovoltaic generation at the time t+1 by using, as an input variable of its deep neural network, the amount of the cloud, the amount of the particulate matter and the amount of the irradiance, in the target region at the time t+1, the numerical weather data of the target region at the time t+1, and the amount of the solar photovoltaic generation in the target region at the time "t" when the target region is affected by the wind.

In addition, the deep learner may predict the amount of the solar photovoltaic generation at the time t+1 by using, as the input variable of its deep neural network, the amount of the cloud, the amount of the particulate matter and the amount of the irradiance, in the target region at the time t+1, the numerical weather data of the target region at the time t+1, and the amount of the solar photovoltaic generation in the target region at the time "t" when the target region is not affected by the wind.

According to another exemplary embodiment, a prediction method of solar photovoltaic generation includes setting a target region where a solar panel is installed and an adjacent region adjacent to the target region by a region setter, collecting numerical weather data of the target region and adjacent region at time "t" and an amount of the solar photovoltaic generation obtained from the solar panel at the time "t," by a first data collector, collecting weather image data of the target region and adjacent region at the time "t" by using a satellite image, by a second data collector, determining whether the target region is affected by wind by comparing the weather image data at time t−1 and the weather image data at the time "t" to each other, by a controller, and predicting the weather image data of the target region at time t+1 in response to whether the target region is affected by the wind, and predicting the amount of the solar photovoltaic generation at the time t+1 by using the amount of the solar photovoltaic generation at the time "t" and the numerical weather data and weather image data of the target region at the time t+1, by a deep learner, wherein "t" is a natural number of 2 or more.

According to yet another exemplary embodiment, a non-transitory computer-readable medium may store a program for executing the prediction method of the solar photovoltaic generation according to another exemplary embodiment of the inventive concept.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
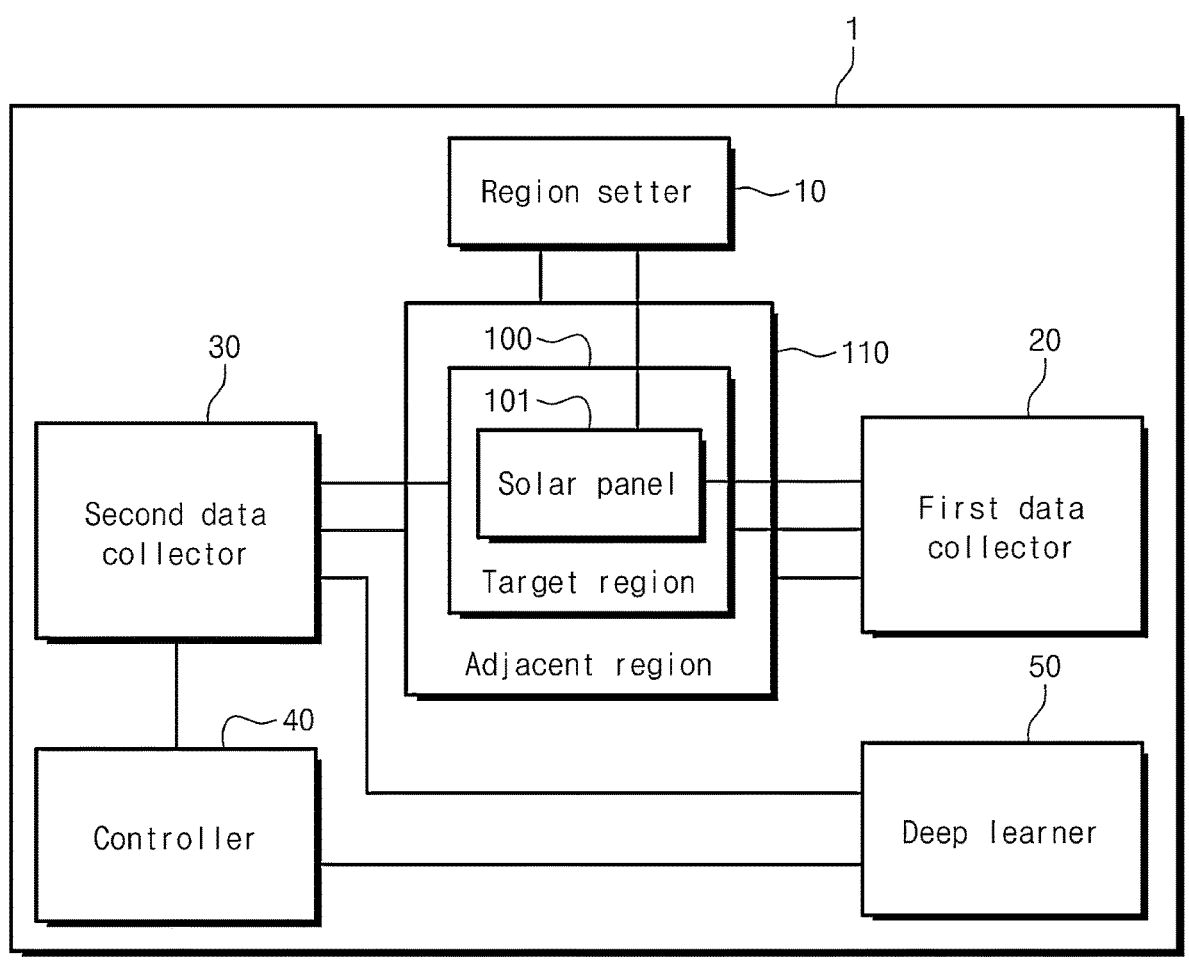
FIG. 1 is a view showing a prediction system for solar photovoltaic generation, according to an embodiment of the inventive concept.

Hereinafter, exemplary embodiments of the inventive concept will be described in detail with reference to the accompanying drawings so that those skilled in the art to which the inventive concept pertains may easily practice the inventive concept. The inventive concept may be modified in various different forms, and is not limited to embodiments provided in the present specification.

A portion unrelated to the description will be omitted in order to obviously describe the inventive concept, and the same or similar components will be denoted by the same reference numeral throughout the present specification. The reference numeral as described above may thus also be used in other drawings.

In addition, the size and thickness of each component shown in the accompanying drawings are arbitrarily shown for convenience of explanation, and the inventive concept is thus not necessarily limited to contents shown in the accompanying drawings. In addition, in the accompanying drawings, thicknesses of some of layers and regions have been exaggerated for convenience of explanation.

In addition, an expression, "the same" in the description may indicate "substantially the same." That is, "the same" may indicate that the corresponding components are the same as each other enough to convince those skilled in the art. The other expressions may be expressions from which "substantially" is omitted.

FIG. 1 is a view showing a prediction system for solar photovoltaic generation, according to an embodiment of the inventive concept.

A prediction system 1 for solar photovoltaic generation, according to an embodiment of the inventive concept, includes: a region setter 10, a first data collector 20, a second data collector 30, a controller 40, a deep learner 50, a target region 100 and an adjacent region 110.

The region setter 10 may set the target region 100 which is a region where a solar panel 101 is installed and the adjacent region 110 which is a region adjacent to the target region 100. The description describes a process in which the region setter 10 sets the target region 100 and the adjacent region 110 in detail below with reference to FIGS. 2A to 2C.

The first data collector 20 may collect numerical weather data of the target region 100 and adjacent region 110 and an amount of the solar photovoltaic generation produced by the solar panel. In detail, the first data collector 20 may continuously receive the numerical weather data of the target region 100 and adjacent region 110 and the amount of the solar photovoltaic generation obtained from the solar panel, from the Korea Meteorological Administration (KMA) and a public data portal.

The numerical weather data may include weather data and air pollutant data. The weather data may include the temperature, precipitation, wind speed, wind direction, humidity, sunlight amount, amount of irradiance and a total amount of cloud in the target region 100 and adjacent region 110. The air pollutant data may include sulfur dioxide ($SO_2$), carbon monoxide (CO), ozone ($O_3$), nitrogen dioxide ($NO_2$), particulate matter (with particulate matters PM 10 and PM 2.5), present in midair over the target region 100 and adjacent region 110.

In detail, the first data collector 20 may continuously receive the numerical weather data of the target region 100 and adjacent region 110 from the KMA at any time "t." For example, the first data collector 20 may receive, from the KMA, the numerical weather data for each hour from 00:00 on Jan. 1, 2015 to 23:00 on Dec. 31, 2015.

In addition, the first data collector 20 may measure the amount of the solar photovoltaic generation produced by the solar panel 101 positioned in the target region 100 at any time "t." For example, the first data collector 20 may receive, from the public data portal, the numerical weather data for each hour from 00:00 on Jan. 1, 2015 to 23:00 on Dec. 31, 2015.

Figure 2A:
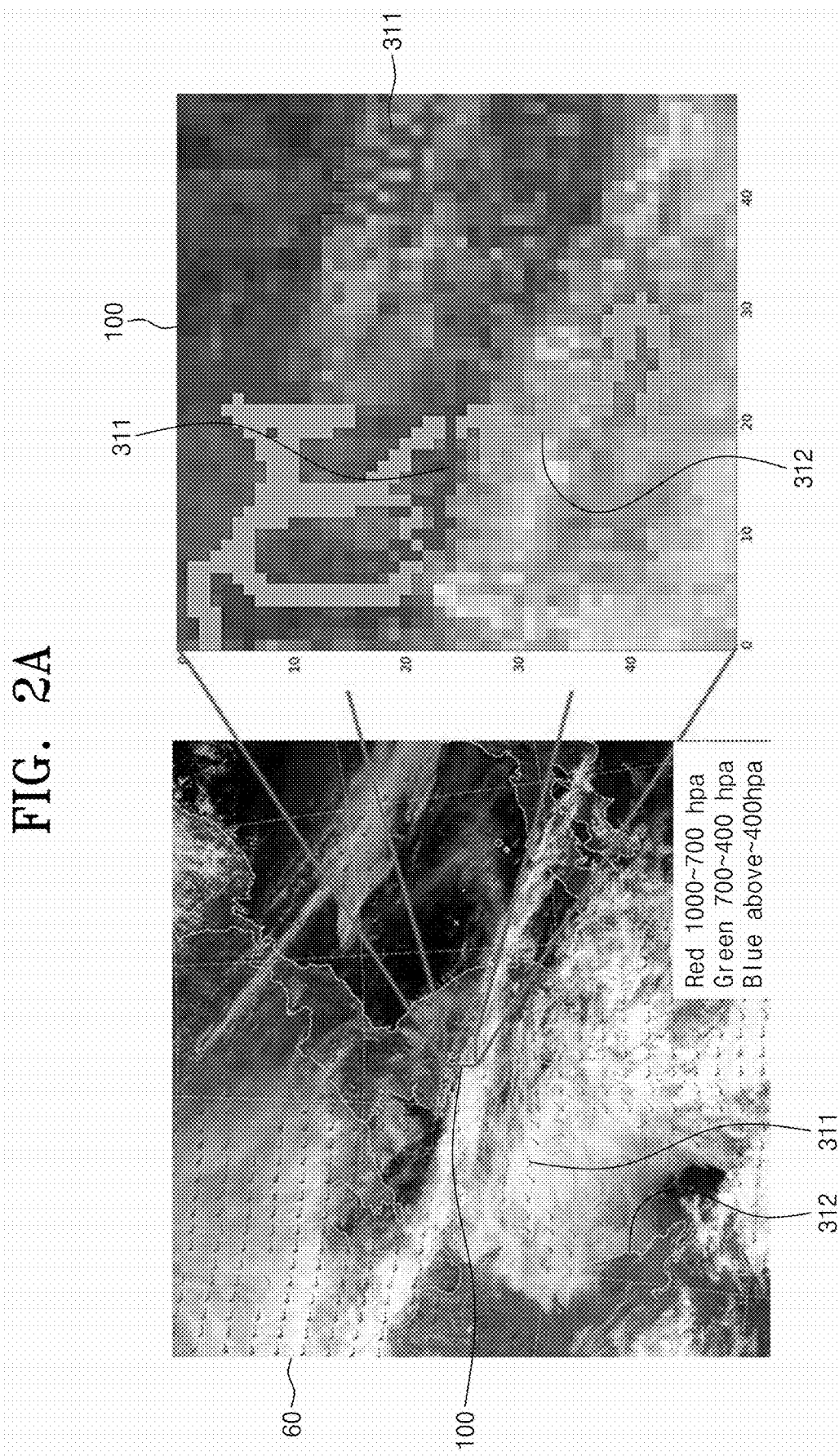
FIG. 2A is a view showing a satellite image of the Republic of Korea, according to an embodiment of the inventive concept.

The second data collector 30 may collect weather image data of the target region 100 and adjacent region 110 by using a satellite image 60 (see FIG. 2A).

The weather image data may include first image data 310 (see FIG. 4A), second image data 320 (see FIG. 4B), third image data 330 (see FIG. 4C) and fourth image data 340, in which the first image data 310 includes the wind direction of wind present in the midair over the target region 100 and adjacent region 110, the second image data 320 includes the amount of the cloud present in the midair over the target region 100 and adjacent region 110, the third image data 330 includes the amount of the particulate matter present in the midair over the target region 100 and adjacent region 110, and the fourth image data 340 includes the amount of the irradiance reaching each ground surface of the target region 100 and adjacent region 110.

In detail, the second data collector 30 may continuously receive the weather image data of the target region 100 and adjacent region 110 at the any time "t" from the National Satellite Center. For example, the second data collector 30 may receive, from the KMA, the first image data 310, the second image data 320, the third image data 330 and the fourth image data 340, for each hour from 00:00 on Jan. 1, 2015 to 23:00 on Dec. 31, 2015.

The controller 40 may determine whether the target region 100 is affected by the wind by comparing the weather image data at time t–1 and the weather image data at the time "t" to each other. In detail, the controller 40 may determine whether the cloud and the particulate matter, present in the midair over the target region 100, are moved by the wind by comparing the first image data 310, second image data 320 and third image data 330 at the time t–1, and the first image data 310, second image data 320 and third image data 330 at the time "t" to each other.

Figure 5:
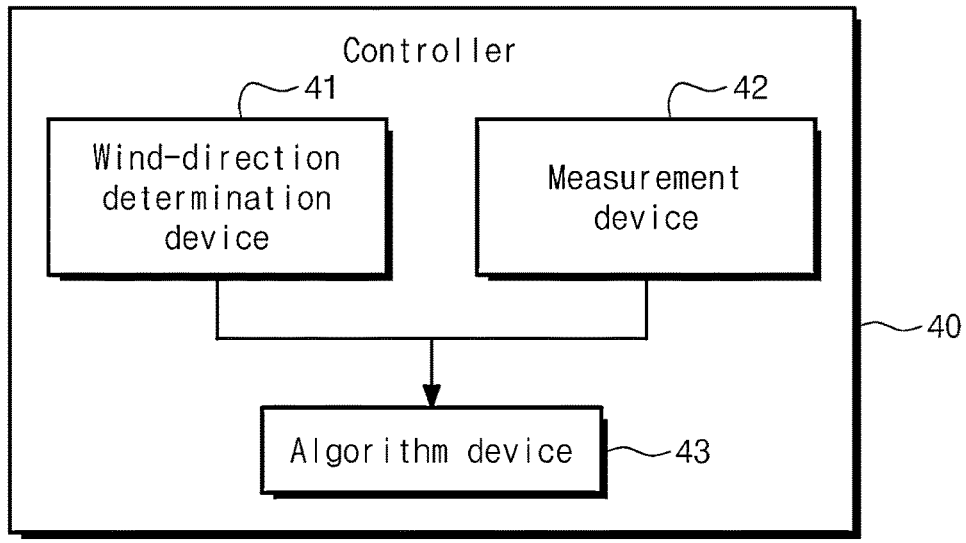
FIG. 5 is a view showing a controller according to an embodiment of the inventive concept.

The description describes, a process in which the controller 40 determines whether the target region 100 is affected by the wind by comparing the weather image data at the time t–1 and the weather image data at the time "t" to each other, in detail with reference to FIG. 5.

A machine learner 51 (see FIG. 6) included in the deep learner 50 may predict the weather image data of the target region 100 at time t+1 in response to whether the target region 100 is affected by the wind. The deep learner 50 may predict the amount of the solar photovoltaic generation at the time t+1 by using the amount of the solar photovoltaic generation collected by the first data collector 20 at the time "t," the numerical weather data collected by the first data collector 20 at the time t+1, and the weather image data of the target region 100, predicted at the time t+1.

The description describes a process in which the machine learner 51 included in the deep learner 50 predicts the weather image data of the target region 100 at the time t+1 and a process in which the deep learner 50 predicts the amount of the solar photovoltaic generation at the time t+1, in detail below with reference to FIGS. 6 to 8.

Figure 2B:
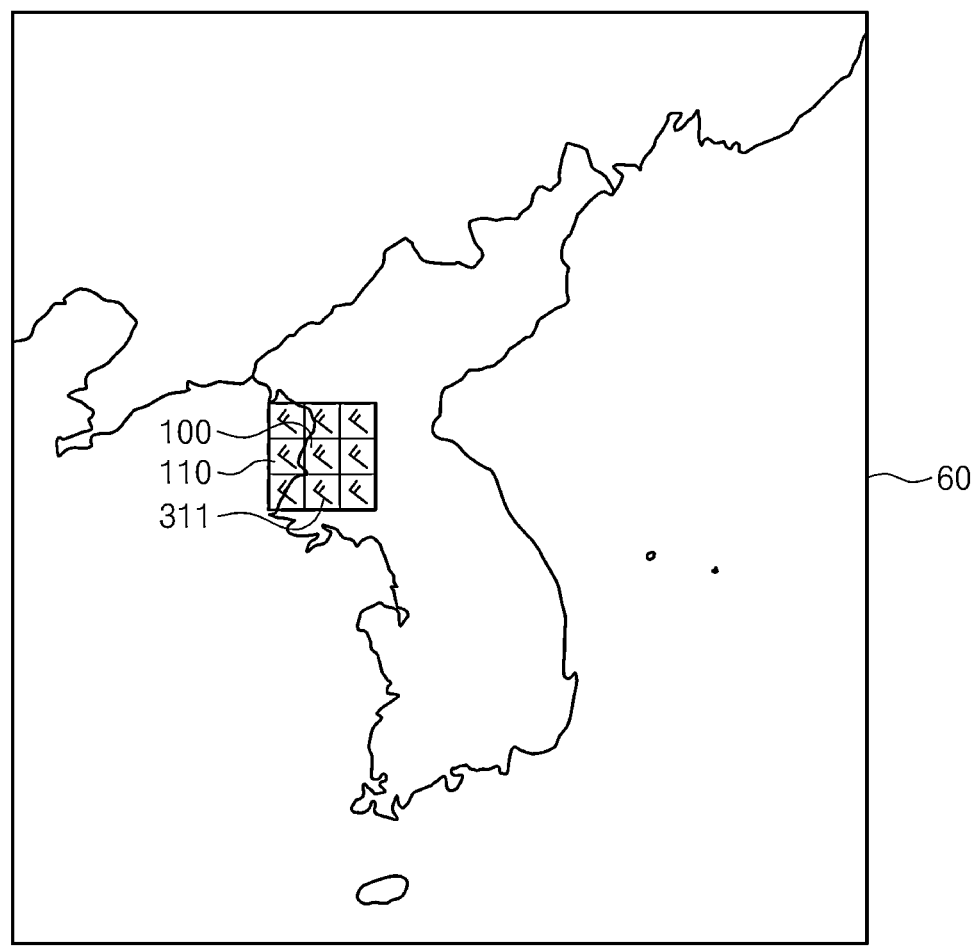
FIG. 2B is a view showing a target region and an adjacent region thereto, according to an embodiment of the inventive concept.
Figure 2C:
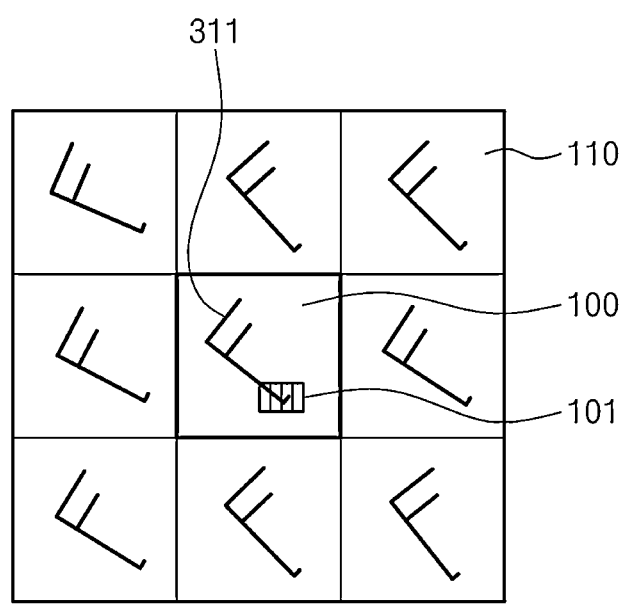
FIG. 2C is an enlarged view showing the target region and the adjacent region, according to an embodiment of the inventive concept.

FIG. 2A is a view showing the satellite image of the Republic of Korea, according to an embodiment of the inventive concept, FIG. 2B is a view showing the target region and the adjacent region, according to an embodiment of the inventive concept, and FIG. 2C is an enlarged view showing the target region and adjacent region, according to an embodiment of the inventive concept.

FIG. 2A is the view showing the satellite image 60 of the Republic of Korea. Here, the satellite image 60 may display a coastline 312 of the Republic of Korea and at least one weather symbol 311 indicating the wind direction and wind speed of the wind. It may be assumed that the solar panel 101 is positioned in Incheon, the Republic of Korea.

Referring to FIGS. 2A to 2C together, the region setter 10 may set the region where the solar panel 101 is positioned as the target region 100. The region setter 10 may set, as the adjacent regions 110, a plurality of regions surrounding the target region 100 and each having the same size as the target region 100.

In detail, the target region 100 may be a region having a shape of a square centered on the weather symbol 311 positioned closest to the solar panel 101 and having a predetermined length as one side. In addition, the adjacent regions 110 may be the regions surrounding the target region 100 by having shapes of eight (8) squares each of which has the same size as the target region 100.

In conclusion, the region setter 10 may set the target region 100 and the adjacent regions 110 having the shape of a lattice centered on the weather symbol 311 positioned closest to the solar panel 101 in the satellite image 60. The target region 100 and the adjacent region 110 may each include the weather symbol 311 indicating the wind direction and wind speed of at least one wind.

The weather symbol 311 may be changed based on the wind direction and wind speed of the wind. That is, a line indicating the wind direction of the weather symbol 311 may be rotated 360 degrees based on the wind direction of the wind. In addition, a line indicating the wind speed of the weather symbol 311 may be changed based on the wind speed of the wind.

The region setter 10 may set the target region 100 by allowing one end of the line indicating the wind direction of the weather symbol 311 to be positioned adjacent to the solar panel 101. Here, the weather symbol 311 may be rotated 360 degrees around a starting point of the weather symbol 311 as the wind direction is changed.

The region setter 10 may set, as the target region 100, the square having the one side greater than or equal to a diameter of the weather symbol 311 when rotated 360 degrees. The region setter 10 may set, as the adjacent regions 110, the plurality of squares each adjacent to the target region 100, surrounding the target region 100 and each having the same size as the target region 100. For example, the region setter 10 may set, as the adjacent regions 110, the eight (8) squares surrounding the target region 100.

Figure 3:
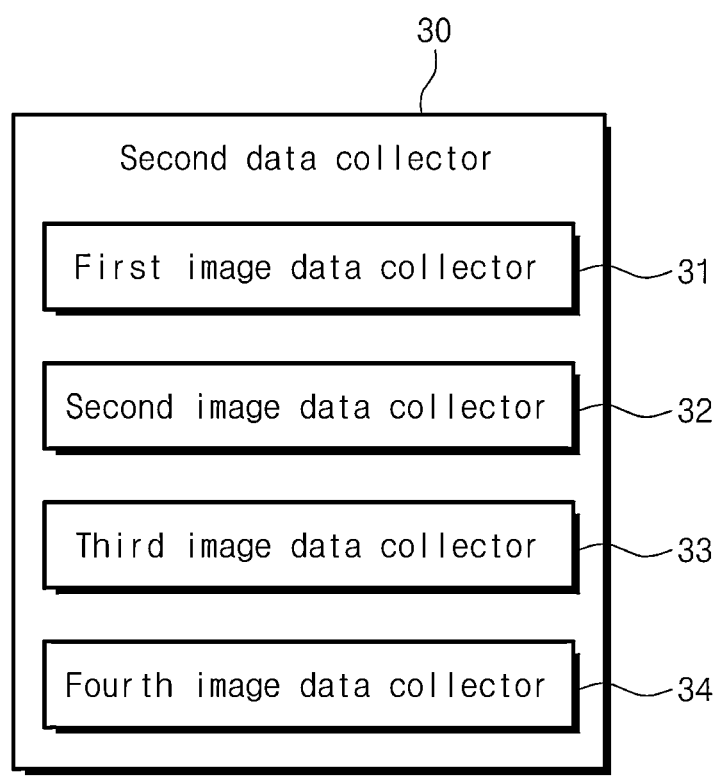
FIG. 3 is a view showing a second data collector according to an embodiment of the inventive concept.

FIG. 3 is a view showing the second data collector according to an embodiment of the inventive concept.

The second data collector 30 according to an embodiment of the inventive concept may include a first image data collector 31, a second image data collector 32, a third image data collector 33 and a fourth image data collector 34.

The first image data collector 31 may collect the first image data 310 (see FIG. 4A) including the wind direction of the wind in the target region 100 and adjacent region 110. The first image data collector 31 may measure the wind direction of the wind in the target region 100 and adjacent region 110 at the time "t" by using the first image data 310.

The second image data collector 32 may collect the second image data 320 (see FIG. 4B) including the thickness and amount of the cloud in the target region 100 and adjacent region 110. The second image data collector 32 may measure the thickness and amount of the cloud in the target region 100 and adjacent region 110 at the time "t" by using the second image data 320.

The third image data collector 33 may collect the third image data 330 (see FIG. 4C) including concentration of the particulate matter in the target region 100 and adjacent region 110. The third image data collector 33 may measure the concentration of the particulate matter in the target region 100 and adjacent region 110 at the time "t" by using the third image data 330, and may measure the amount of the particulate matter based on this concentration.

The fourth image data collector 34 may collect the fourth image data 340 (see FIG. 4D) including the amount of the irradiance in the target region 100 and adjacent region 110. The fourth image data collector 34 may measure the amount of the irradiance in the target region 100 and adjacent region 110 at the time "t" by using the fourth image data 340.

Figure 4A:
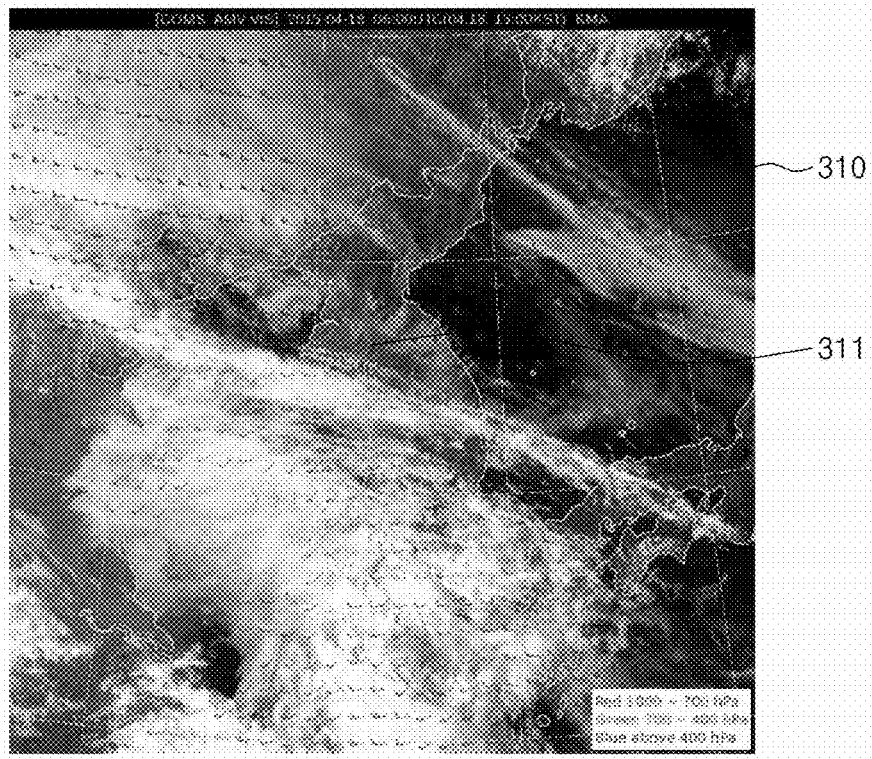
FIG. 4A is a view showing first image data according to an embodiment of the inventive concept.
Figure 4B:
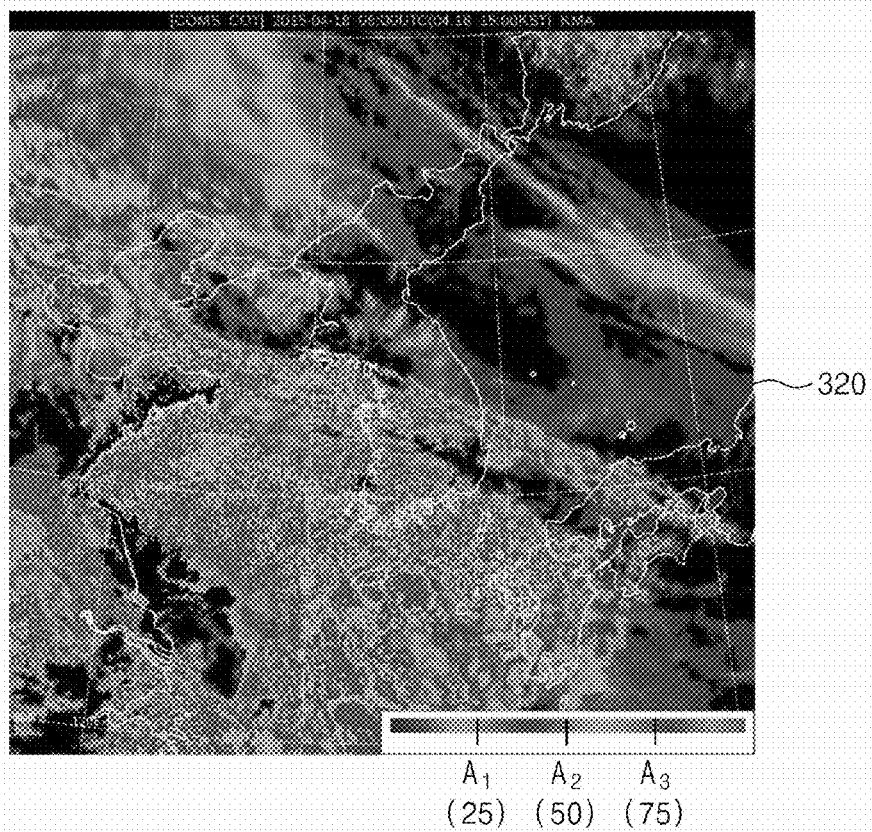
FIG. 4B is a view showing second image data according to an embodiment of the inventive concept.
Figure 4C:
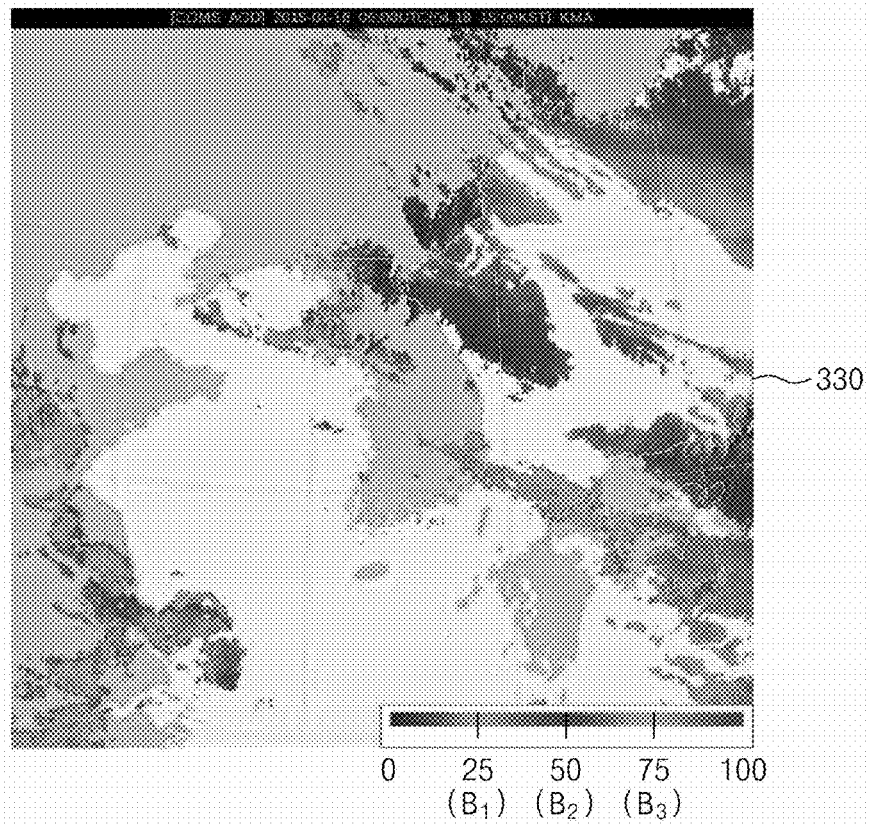
FIG. 4C is a view showing third image data according to an embodiment of the inventive concept.
Figure 4D:
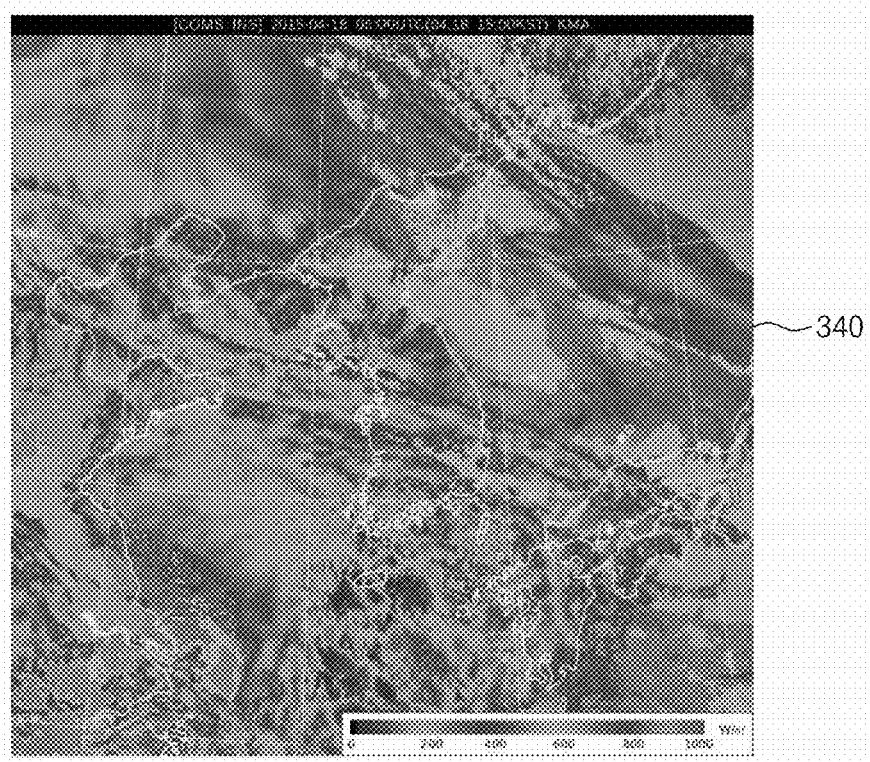
FIG. 4D is a view showing fourth image data according to an embodiment of the inventive concept.

FIG. 4A is a view showing the first image data according to an embodiment of the inventive concept, FIG. 4B is a view showing the second image data according to an embodiment of the inventive concept, FIG. 4C is a view showing the third image data according to an embodiment of the inventive concept, and FIG. 4D is a view showing the fourth image data according to an embodiment of the inventive concept.

Referring to FIG. 4A, the first image data 310 may display the weather symbol 311 based an altitude at the time "t." For example, the weather symbol 311 marked in blue may indicate the wind direction and wind speed of the wind blowing from an upper layer of the midair, having an air pressure of 400 hectopascal (hPa). The weather symbol 311 marked in green may indicate the wind direction and wind speed of the wind blowing from a middle layer of the midair, having an air pressure greater than 400 hpa and less than 700 hpa. The weather symbol 311 marked in red may indicate the wind direction and wind speed of the wind blowing from a lower layer of the midair, having an air pressure of 700 hp or more.

Referring to FIGS. 2A, 2B, 3 and 4A, at the time "t," wind having a wind speed of 7 m/s in a northwest direction may blow from the midair over the target region 100 where solar panel 101 is installed and adjacent region 110.

Referring to FIG. 4B, the second image data 320 may display the thickness and amount of the cloud in the midair over the target region 100 and adjacent region 110 at the time "t." The second image data 320 may include a pixel marked in a different color based on the thickness and amount of the cloud in the midair over the target region 100 and adjacent region 110.

For example, the larger the number of pixels marked in blue, the smaller the amount of the cloud. The larger the number of pixels marked in purple, the greater the amount of the cloud. Hereinafter, it may be assumed that the cloud has an amount of zero to 100. Here, a first cloud amount A1 may indicate a case where the cloud has an amount of 25, a second cloud amount A2 may indicate a case where the cloud has an amount of 50, and a third cloud amount A3 may indicate a case where the cloud has an amount of 75.

The weather may be sunny when the cloud has an amount greater than zero and less than the first cloud amount A1. The weather may be partly cloudy when the cloud has an amount greater than or equal to the first cloud amount A1 and less than the second cloud amount A2. The weather may be mostly cloudy when the cloud has an amount greater than or equal to the second cloud amount A2 and less than the third cloud amount A3. The weather may be cloudy when the cloud has an amount greater than or equal to the third cloud amount A3 and less than 100. Referring to FIG. 4B, it may be noted that the amount of the cloud indicates the sunny weather because the Incheon area has a large number of pixels marked in blue at the time "t."

Referring to FIG. 4C, the third image data 330 may display the amount of the particulate matter based on the concentration of the particulate matter in the midair over the target region 100 and adjacent region 110 at the time "t." The third image data 330 may include a pixel marked in a different color based on the amount of the particulate matter, changed based on the concentration of the particulate matter in the midair over the target region 100 and adjacent region 110.

For example, the larger the number of pixels marked in blue, the smaller the amount of the particulate matter. The larger the number of pixels marked in purple, the greater the amount of the particulate matter. Hereinafter, it may be assumed that the particulate matter has an amount of zero to 100. Here, a first particulate matter amount B1 may indicate a case where the particulate matter has an amount of 25, a second particulate matter amount B2 may indicate a case where the particulate matter has an amount of 50, and a third particulate matter amount B3 may indicate a case where the particulate matter has an amount of 75.

The air may be fresh when the particulate matter has an amount greater than zero and less than the first particulate matter amount B1. The air may be moderate when the particulate matter has an amount greater than or equal to the first particulate matter amount B1 and less than the second particulate matter amount B2. The air may be unhealthy when the particulate matter has an amount greater than or equal to the second particulate matter amount B2 and less than the third particulate matter amount B3. The air may be very unhealthy when the particulate matter has an amount greater than or equal to the third particulate matter amount B3 and less than 100.

Referring to FIG. 4C, it may be noted that the amount of the particulate matter indicates the fresh air because the Incheon area has a large number of pixels marked in blue at the time "t."

Referring to FIG. 4D, the fourth image data 340 may display the amount of the irradiance in the target region 100 and adjacent region 110 at the time "t." The fourth image data 340 may include a pixel marked in a different color based on the amount of the irradiance reaching the each ground surface of the target region 100 and adjacent region 110.

For example, the larger the number of pixels marked in blue, the smaller the amount of the irradiance reaching the each ground surface of the target region 100 and adjacent region 110. The larger the number of pixels marked in purple, the greater the amount of the irradiance reaching the each ground surface of the target region 100 and adjacent region 110. Referring to FIG. 4D, it may be noted that the irradiance has a small amount because the Incheon area has a large number of pixels marked in blue at the time "t."

FIG. 5 is a view showing the controller according to an embodiment of the inventive concept.

The controller 40 according to an embodiment of the inventive concept may include a wind-direction determination device 41, a measurement device 42 and an algorithm device 43.

The wind-direction determination device 41 may determine the wind direction of the wind in the target region 100 and adjacent region 110 at the time "t." In detail, the wind-direction determination device 41 may determine the wind direction of the wind blowing from the midair over the target region 100 and adjacent region 110 by using the first image data 310 collected by the first image data collector 31 at the time "t."

Referring to FIGS. 4A and 5, the wind-direction determination device 41 may determine the wind direction of the wind blowing from the midair over the target region 100 and adjacent region 110 by using the weather symbol 311 shown in the target region 100 and adjacent region 110 of the first image data 310. Here, the wind-direction determination device 41 may determine the wind direction of the wind blowing from the midair over the target region 100 and adjacent region 110 at the time "t" as the northwest wind direction.

The measurement device 42 may measure the amount of the cloud, the amount of the particulate matter and the amount of the irradiance in the midair over the target region 100 and adjacent region 110 at the time "t." In detail, referring to FIGS. 4B to 4D and 5, the measurement device 42 may measure the amount of the cloud, the amount of the particulate matter and the amount of the irradiance in the midair over the target region 100 and adjacent region 110 at the time "t" by using the second to fourth image data 320, 330 and 340, collected by the second to fourth image data collectors 32, 33 and 34 at the time "t."

The measurement device 42 may measure the amount of the cloud at the time "t" by counting the number of pixels indicating the amount of the cloud present in the target region 100 and adjacent region 110 of the second image data 320. The measurement device 42 may measure the amount of the particulate matter at the time "t" by counting the number of pixels indicating the amount of the particulate matter based on the concentration of the particulate matter in the target region 100 and adjacent region 110 of the third image data 330.

The measurement device 42 may measure the amount of the irradiance in the target region 100 and the adjacent region 110 at the time "t" by obtaining an average number of the pixels indicating the amount of the irradiance in the fourth image data 340. In detail, the measurement device 42 may determine the average number of the pixels indicating the target region 100 in the fourth image data 340 as the amount of the irradiance in the target region 100 at the time "t."

In addition, the measurement device 42 may determine an average number of the pixels indicating the adjacent region 110 in the fourth image data 340 as the amount of the irradiance in the adjacent region 110.

The algorithm device 43 may determine whether the cloud and the particulate matter, present in the midair over the target region 100 are affected by the wind by using the wind direction of the wind, the amount of the cloud and the amount of the particulate matter, in the target region 100 and the adjacent region 110 at the time t−1 and the wind direction of the wind, the amount of the cloud and the amount of the particulate matter, in the target region 100 and the adjacent region 110 at the time "t."

In detail, when described with reference to FIGS. 2A to 2C and 5, the direction of the wind in the target region 100, measured at the time t−1, may indicate the northwest wind direction, the amount of the cloud may indicate the sunny weather, and the amount of the particulate matter may indicate the fresh air. In addition, the direction of the wind in the adjacent region 110 positioned in the northwest direction of the target region 100, measured at time t−1, may indicate the northwest wind direction, the amount of the cloud may indicate the partly-cloudy weather, and the amount of the particulate matter may indicate the moderate air. In addition, the amount of the cloud in the target region 100, measured at the time "t," may indicate the partly-cloudy weather, and the amount of the particulate matter may indicate the moderate air.

In conclusion, the cloud and the particulate matter in the adjacent region 110 at the time t−1 may be moved to the target region 100 due to the northwest wind, and the amount of the cloud and the amount of the particulate matter may thus be increased in the target region 100 at the time "t." In this case, the algorithm device 43 may determine that the target region 100 is affected by the wind.

According to another embodiment, the direction of the wind in the target region 100, measured at the time t−1, may indicate the northwest wind direction, the amount of the cloud may indicate the sunny weather, and the amount of the particulate matter may indicate the fresh air. In addition, the direction of the wind in the adjacent region 110 positioned in the northwest direction of the target region 100, measured at time t−1, may indicate the northwest wind direction, the amount of the cloud may indicate the partly-cloudy weather, and the amount of the particulate matter may indicate the moderate air. In addition, the amount of the cloud in the target region 100, measured at the time "t," may indicate the sunny weather, and the amount of the particulate matter may indicate the fresh air. In this case, the algorithm device 43 may determine that the target region 100 is not affected by the wind.

Figure 6:
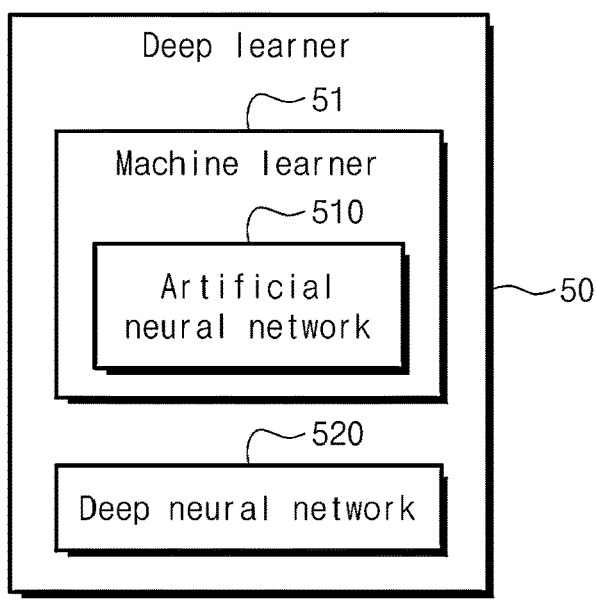
FIG. 6 is a view showing a deep learner according to an embodiment of the inventive concept.

FIG. 6 is a view showing the deep learner according to an embodiment of the inventive concept.

The deep learner 50 according to an embodiment of the inventive concept may include an artificial neural network 510 included in the machine learner 51 and a deep neural network 520.

The machine learner 51 included in the deep learner 50 may predict the amount of the cloud and the amount of the particulate matter, in the target region 100 at the time t+1 by using the amount of the cloud and the amount of the particulate matter, in the target region 100 at the time "t" as an input variable of the artificial neural network 510. The description describes a process in which the artificial neural network 510 predicts the amount of the cloud and the amount of the particulate matter, in the target region 100 at the time t+1 in detail with reference to FIG. 7.

Figure 8:
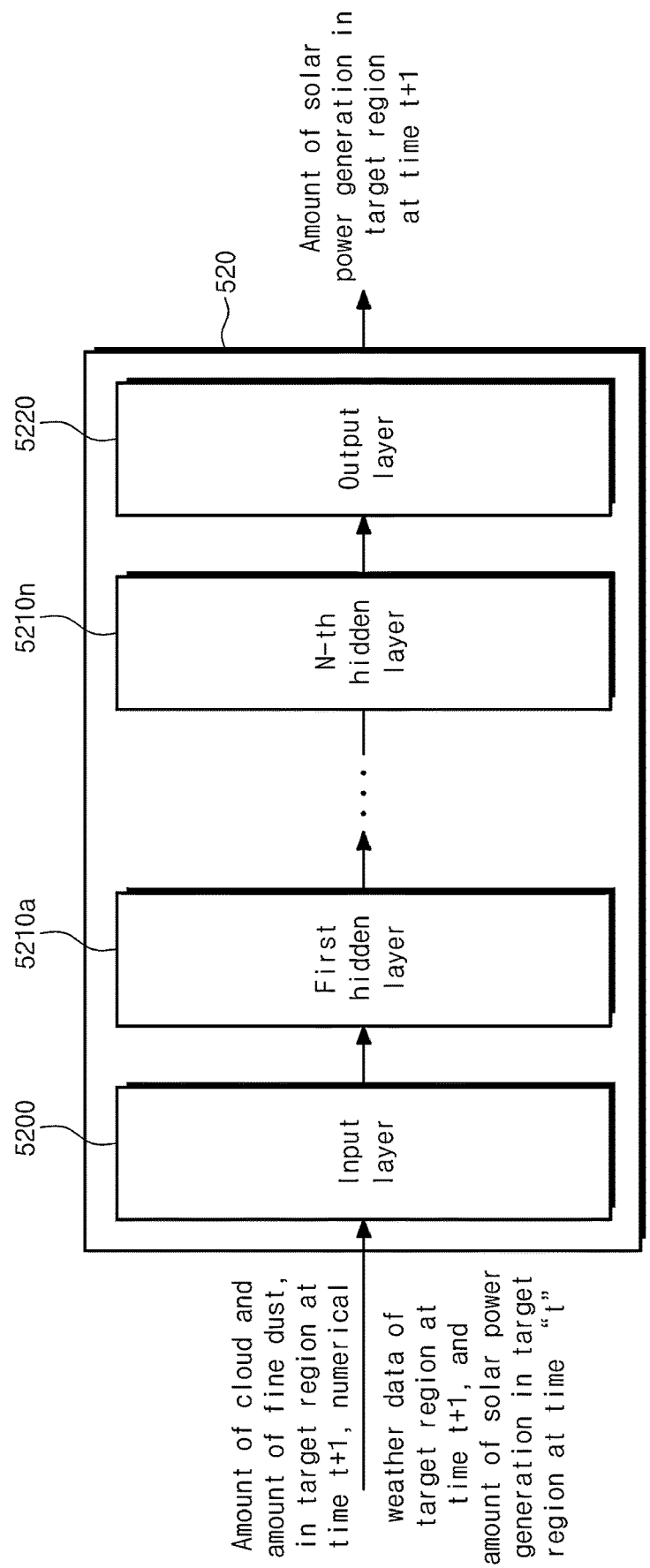
FIG. 8 is a view showing a process of predicting an amount of solar photovoltaic generation, according to an embodiment of the inventive concept.

The deep learner 50 may predict the amount of the solar photovoltaic generation in the target region 100 at the time t+1 by using, as an input variable of the deep neural network 520, the amount of the cloud, the amount of the particulate matter and the amount of the irradiance, in the target region 100 at the time t+1, the numerical weather data in the target region 100 at the time t+1, and the amount of the solar photovoltaic generation in the target region 100 at the time "t." The description describes a process in which the deep neural network 520 predicts the amount of the cloud and the amount of the particulate matter, in the target region 100 at the time t+1 in detail with reference to FIG. 8.

Figure 7:
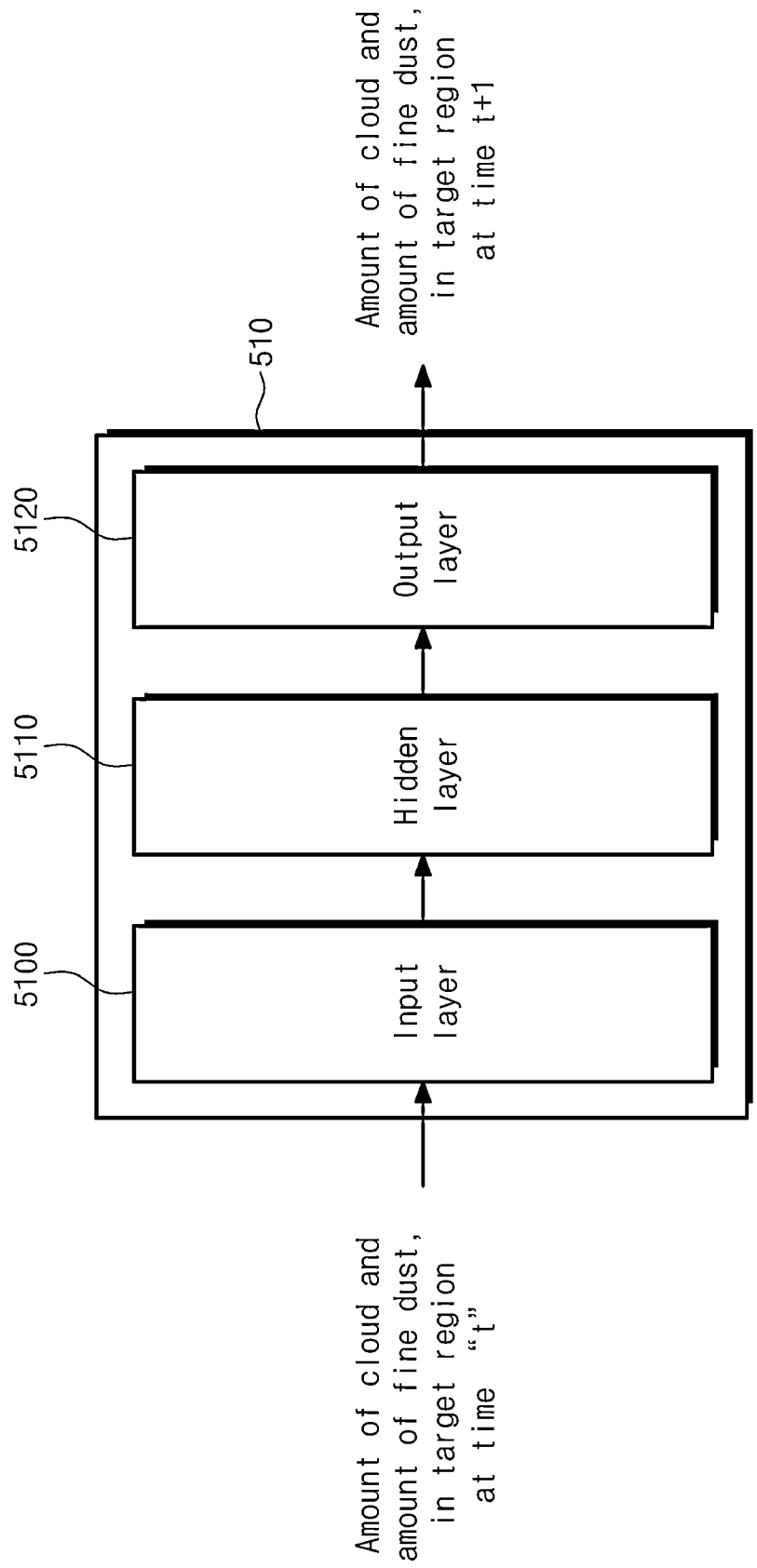
FIG. 7 is a view showing a process of predicting an amount of cloud and an amount of particulate matter in the target region, according to an embodiment of the inventive concept.

FIG. 7 is a view showing the process of predicting the amount of the cloud and the amount of the particulate matter, in the target region, according to an embodiment of the inventive concept.

The artificial neural network 510 according to an embodiment of the inventive concept may include an input layer 5100, a hidden layer 5110 and an output layer 5120.

The amount of the cloud and the amount of the particulate matter, in the target region 100 at the time "t" may be input to the input layer 5100 as the input variables of the artificial neural network 510.

The machine learner 51 may perform a calculation in the hidden layer 5110 by substituting the input variable input to the input layer 5100 into an activation function. A sigmoid function may be the activation function used in the hidden layer 5110 of the inventive concept.

The machine learner 51 may input the amount of the cloud and the amount of the particulate matter, in the target region 100 at the time "t" to the sigmoid activation function as the input variables, and may then perform a machine learning based thereon, in the hidden layer 5110.

In detail, the machine learner 51 may input, as the input variables of the artificial neural network 510, the amount of the cloud and the amount of the particulate matter, in the target region 100 at the time "t" when the target region 100 is affected by the wind, and may then perform the learning based thereon to predict the amount of the cloud and the amount of the particulate matter, in the target region 100 at the time t+1.

In addition, the machine learner 51 may perform the learning to determine that the amount of the cloud in the target region 100 at the time t+1 is the same as the amount of the cloud in the target region 100 at the time "t" when the target region 100 is not affected by the wind. The machine learner 51 may then perform the machine learning to determine that the amount of the particulate matter in the target region 100 at the time t+1 is the same as the amount of the particulate matter in the target region 100 at the time "t."

The machine learner 51 may output, from the output layer 5120, the amount of the cloud and the amount of the particulate matter, in the target region 100 at the time t+1, calculated as a result of performing the machine learning in the hidden layer 5110.

FIG. 8 is a view showing the process of predicting the amount of the solar photovoltaic generation, according to an embodiment of the inventive concept.

The deep neural network 520 according to an embodiment of the inventive concept may include an input layer 5200, first to n-th hidden layers 5210a to 5210n and an output layer 5220.

The amount of the cloud, the amount of the particulate matter and the amount of the irradiance, in the target region 100 at the time t+1 may by input to the input layer 5200 as input variables of the deep neural network 520.

The deep learner 50 may perform a calculation in the first to the n-th hidden layers 5210a to 5210n by substituting the input variables input to the input layer 5200 into activation functions. The various activation functions including a hyperbolic tangent (tan hx) function may be used in the first to the n-th hidden layers 5210a to 5210n of the inventive concept.

The deep learner 50 may perform a calculation in the first to the n-th hidden layers 5210a to 5210n by inputting the amount of the cloud, the amount of the particulate matter and the amount of the irradiance, in the target region 100 at the time t+1, the numerical weather data of the target region 100 at the time t+1, and the amount of the solar photovoltaic generation in the target region 100 at the time "t" to the various activation functions as the input variables, and then by performing the deep learning based thereon.

In detail, the deep learner 50 may input, as the input variables of the deep neural network 520, the amount of the cloud, the amount of the particulate matter and the amount of the irradiance, in the target region 100 at the time t+1, the numerical weather data of the target region 100 at the time t+1, and the amount of the solar photovoltaic generation in the target region 100 at the time "t" when the target region 100 is affected by the wind, and may then perform the deep learning based thereon to predict the amount of the solar photovoltaic generation in the target region 100 at the time t+1.

In detail, the deep learner 50 may input, as the input variables of the various activation functions including the hyperbolic tangent function, the amount of the cloud, the amount of the particulate matter and the amount of the irradiance, in the target region 100 at the time t+1, the numerical weather data of the target region 100 at the time t+1, and the amount of the solar photovoltaic generation in the target region 100 at the time "t" when the target region 100 is not affected by the wind, and may then perform the deep learning based thereon to predict the amount of the solar photovoltaic generation in the target region 100 at the time t+1.

The deep learner 50 may output, from the output layer 5220, the amount of the solar photovoltaic generation in the target region 100 at the time t+1, calculated as a result of performing the deep learning in the first to the n-th hidden layers 5210a to 5210n.

Figure 9:
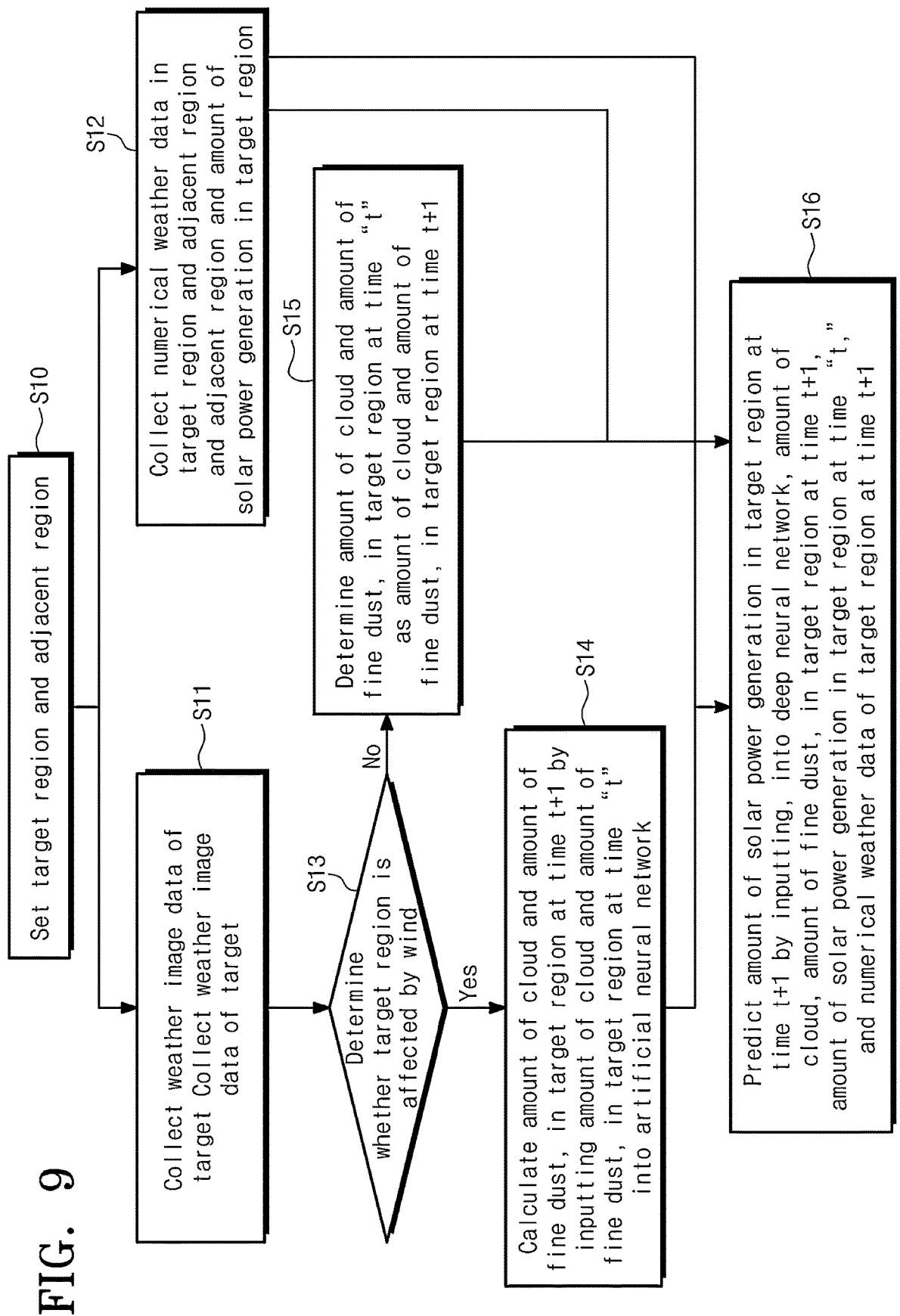
FIG. 9 is a flowchart showing a process of predicting an amount of solar photovoltaic generation, according to an embodiment of the inventive concept.

FIG. 9 is a flowchart showing a process of predicting an amount of solar photovoltaic generation, according to an embodiment of the inventive concept.

A region setter 10 may set a target region and an adjacent region in S10.

In detail, the region setter 10 may set one end of a weather symbol 311 indicating a wind direction to be positioned on a solar panel 101. The region setter 10 may set, as the target region 100, a square having one side greater than or equal to a diameter of the weather symbol 311 when rotated 306 degrees.

The region setter 10 may set, as the adjacent regions 110, a plurality of squares each adjacent to the target region 100, surrounding the target region 100 and each having the same size as the target region 100.

A second data collector 30 may collect weather image data of the target region and adjacent region at time "t" in S11.

In detail, the second data collector 30 may collect first image data 310 indicating the wind direction of wind, second image data 320 indicating an amount of cloud, third image data 330 indicating an amount of particulate matter, and fourth image data 340 indicating an amount of irradiance, in midair over the target region 100 and adjacent region 110 at the time "t."

A first data collector 20 may collect numerical weather data in the target region and the adjacent region and the amount of the solar photovoltaic generation in the target region in S12.

In detail, the first data collector 20 may measure the numerical weather data in the target region 100 and the adjacent region 110 and the amount of the solar photovoltaic generation in the target region 100, in real time.

A controller 40 may determine whether the target region is affected by the wind in S13.

In detail, the controller 40 may determine whether the target region 100 is affected by the wind by comparing the amount of the cloud in the target region 100 at the time "t" and the amount of the cloud in the target region 100 at time t−1 to each other. The controller 40 may also determine whether the target region 100 is affected by the particulate matter by comparing the amount of the particulate matter in the target region 100 at the time "t" and the amount of the particulate matter in the target region 100 at the time t−1 to each other.

When the target region is affected by the wind, a machine learner included in a deep leaner may calculate the amount of the cloud and the amount of the particulate matter, in the target region at time t+1 by inputting the amount of the cloud and the amount of the particulate matter, in the target region at the time "t" into an artificial neural network in S14.

When the target region is not affected by the wind, the machine learner may determine the amount of the cloud and the amount of the particulate matter, in the target region at the time "t" as the amount of the cloud and the amount of the particulate matter, in the target region at the time t+1 in S15.

The deep learner 50 may predict the amount of the solar photovoltaic generation in the target region at the time t+1 by inputting, into a deep neural network, the amount of the cloud, the amount of the particulate matter and the amount of the irradiance, in the target region at the time t+1 and the amount of the solar photovoltaic generation in the target region at the time "t" in S16.

The prediction system for the solar photovoltaic generation according to the inventive concept may effectively predict the amount of the solar photovoltaic generation regardless of the external weather factor and may maintain the stable supply and demand of the power.

While the inventive concept has been described with reference to the exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A prediction system for solar photovoltaic generation, the system comprising:
    a region setter configured to set a target region where a solar panel is installed and an adjacent region adjacent to the target region;
    a first data collector configured to collect numerical weather data of the target region and adjacent region at time "t" and an amount of the solar photovoltaic generation obtained from the solar panel at the time "t";
    a second data collector configured to collect weather image data of the target region and adjacent region at the time "t" by using a satellite image;
    a controller configured to determine whether the target region is affected by wind by comparing the weather image data at time t−1 and the weather image data at the time "t" to each other; and
    a deep learner configured to predict the weather image data of the target region at time t+1 in response to whether the target region is affected by the wind, and predict the amount of the solar photovoltaic generation at the time t+1 by using the amount of the solar photovoltaic generation at the time "t" and the numerical weather data and weather image data of the target region at the time t+1,
    wherein "t" is a natural number of 2 or more,
    wherein the second data collector includes:
        a first image data collector that collects first image data including a wind direction of the wind in the target region and adjacent region;
        a second image data collector that collects second image data including an amount of cloud in the target region and adjacent region;
        a third image data collector that collects third image data including an amount of particulate matter in the target region and adjacent region; and
        a fourth image data collector that collects fourth image data including an amount of irradiance in the target region and adjacent region,
    wherein the controller includes:
        a wind-direction determination device that determines the wind direction of the wind in the target region and adjacent region,
        a measurement device that measures the amount of the cloud, the amount of the particulate matter and the amount of the irradiance, in the target region and the adjacent region, and
        an algorithm device that determines whether the target region is affected by the wind by using the wind directions of the wind, the amounts of the cloud and the amounts of the particulate matter, in the target region and the adjacent region at the time t−1 and the time "t"
    wherein the algorithm device determines that the particulate matter in the target region is moved by the wind when the amount of the particulate matter in the target region at the time "t" is greater or less than the amount of the particulate matter in the target region at the time t−1,
    wherein the algorithm device further determines that the particulate matter in the target region is not moved by the wind when the amount of the particulate matter in the target region at the time "t" is the same as the amount of the particulate matter in the target region at the time t−1.

2. The system of claim 1, wherein the algorithm device determines that the cloud in the target region is moved by the wind when the amount of the cloud in the target region at the time "t" is greater or less than the amount of the cloud in the target region at the time t−1, wherein the algorithm device further determines that the cloud in the target region is not moved by the wind when the amount of the cloud in the target region at the time "t" is the same as the amount of the cloud in the target region at the time t−1.

3. The system of claim 1, wherein the target region has a shape of a square centered on a weather symbol positioned closest to the solar panel and having a predetermined length, and the adjacent regions have shapes of squares surrounding the target region and each having the same size as the target region.

4. The system of claim 1, wherein the first image data includes at least one weather symbol indicating the wind direction in the target region and adjacent region, and the wind-direction determination device determines the wind direction in the target region and adjacent region by using the weather symbol.

5. The system of claim 1, wherein the second image data includes one or more pixels marked in a different color based on thickness of the cloud in the target region and adjacent region.

6. The system of claim 5, wherein the measurement device measures the amount of the cloud based on the thickness of the cloud in the target region and adjacent region by using a number of the pixels.

7. The system of claim 1, wherein the third image data includes one or more pixels marked in a different color based on concentration of the particulate matter in the target region and adjacent region.

8. The system of claim 7, wherein the measurement device measures the amount of the particulate matter based on the concentration of the particulate matter in the target region and adjacent region by using a number of the pixels.

9. The system of claim 1, wherein the fourth image data includes a pixel marked in a different color based on the amount of the irradiance in the target region and adjacent region.

10. The system of claim 9, wherein the measurement device measures the amount of the irradiance in the target region by using an average number of the pixels indicating the target region, and measures the amount of the irradiance in the adjacent region by using an average number of the pixels indicating the adjacent region.

11. The system of claim 1, wherein a machine learner included in the deep learner predicts the amount of the cloud and the amount of the particulate matter, in the target region at the time t+1 by using the amount of the cloud and the amount of the particulate matter, in the target region at the time "t" as an input variable of its artificial neural network when the target region is affected by the wind.

12. The system of claim 11, wherein the deep learner predicts the amount of the solar photovoltaic generation at the time t+1 by using, as an input variable of its deep neural network, the amount of the cloud, the amount of the particulate matter and the amount of the irradiance, in the target region at the time t+1, the numerical weather data of the target region at the time t+1, and the amount of the solar photovoltaic generation in the target region at the time "t" when the target region is affected by the wind.

13. The system of claim 1, wherein the machine learner included in the deep learner determines the amount of the cloud and the amount of the particulate matter, in the target region at the time "t" as the amount of the cloud and the amount of the particulate matter, in the target region at the time t+1 when the target region is not affected by the wind.

14. The system of claim 13, wherein the deep learner predicts the amount of the solar photovoltaic generation at the time t+1 by using, as the input variable of its deep neural network, the amount of the cloud, the amount of the particulate matter and the amount of the irradiance, in the target region at the time t+1, the numerical weather data of the target region at the time t+1, and the amount of the solar photovoltaic generation in the target region at the time "t" when the target region is not affected by the wind.

15. A prediction method of solar photovoltaic generation, the method comprising:

setting, by a region setter, a target region where a solar panel is installed and an adjacent region adjacent to the target region by a region setter;

collecting, by a first data collector, numerical weather data of the target region and adjacent region at time "t" and an amount of the solar photovoltaic generation obtained from the solar panel at the time "t," by a first data collector;

collecting, by a second data collector, weather image data of the target region and adjacent region at the time "t" by using a satellite image, by a second data collector;

determining, by a controller, whether the target region is affected by wind by comparing the weather image data at time t−1 and the weather image data at the time "t" to each other, by a controller; and predicting, by a deep learner, the weather image data of the target region at time t+1 in response to whether the target region is affected by the wind, and predicting the amount of the solar photovoltaic generation at the time t+1 by using the amount of the solar photovoltaic generation at the time "t" and the numerical weather data and weather image data of the target region at the time t+1, by a deep learner, wherein "t" is a natural number of 2 or more, wherein the second data collector includes:
 a first image data collector that collects first image data including a wind direction of the wind in the target region and adjacent region;
 a second image data collector that collects second image data including an amount of cloud in the target region and adjacent region;
 a third image data collector that collects third image data including an amount of particulate matter in the target region and adjacent region; and
 a fourth image data collector that collects fourth image data including an amount of irradiance in the target region and adjacent region, wherein the controller includes:
 a wind-direction determination device that determines the wind direction of the wind in the target region and adjacent region,
 a measurement device that measures the amount of the cloud, the amount of the particulate matter and the amount of the irradiance, in the target region and the adjacent region, and
 an algorithm device that determines whether the target region is affected by the wind by using the wind directions of the wind, the amounts of the cloud and the amounts of the particulate matter, in the target region and the adjacent region at the time t−1 and the time "t"

wherein the algorithm device determines that the particulate matter in the target region is moved by the wind when the amount of the particulate matter in the target region at the time "t" is greater or less than the amount of the particulate matter in the target region at the time t−1.

wherein the algorithm device further determines that the particulate matter in the target region is not moved by the wind when the amount of the particulate matter in the target region at the time "t" is the same as the amount of the particulate matter in the target region at the time t−1.

16. A non-transitory computer-readable medium storing a program for executing the prediction method of the solar photovoltaic generation of claim 15.

* * * * *